May 18, 1937. H. E. SJÖSTRAND 2,080,511
DEVICE FOR LOCATING THE POSITION OF A MOVABLE BODY
Filed Dec. 10, 1932 2 Sheets-Sheet 1
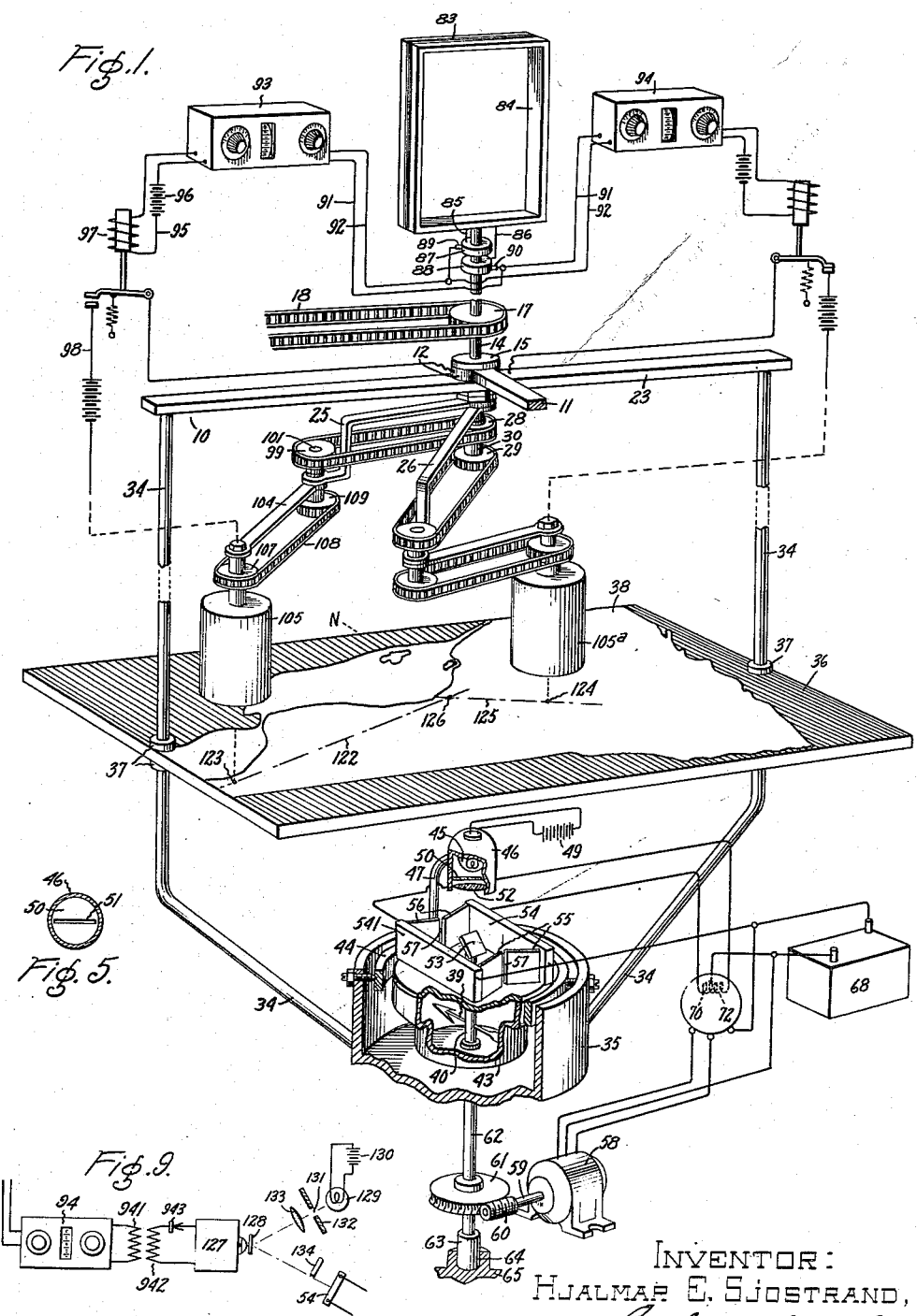
INVENTOR:
HJALMAR E. SJOSTRAND,
by
His Attorneys May 18, 1937.  H. E. SJÖSTRAND  2,080,511
DEVICE FOR LOCATING THE POSITION OF A MOVABLE BODY
Filed Dec. 10, 1932  2 Sheets-Sheet 2
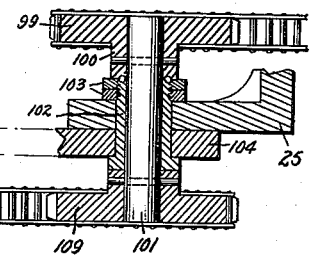
Fig.7.
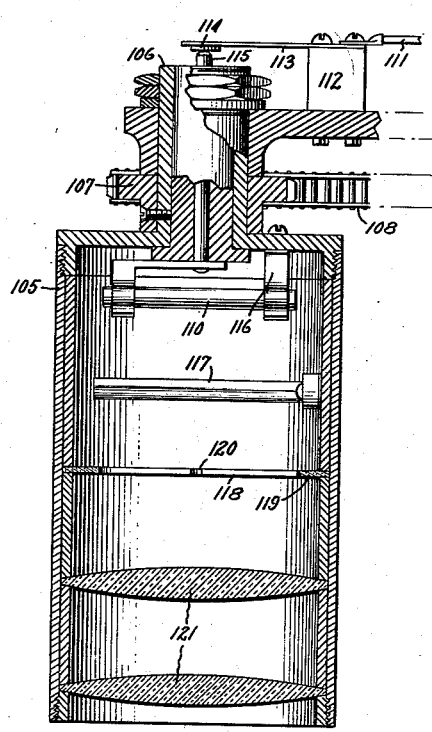
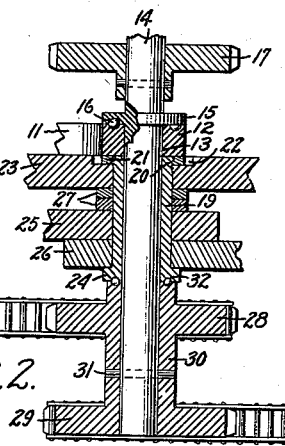
Fig.2.
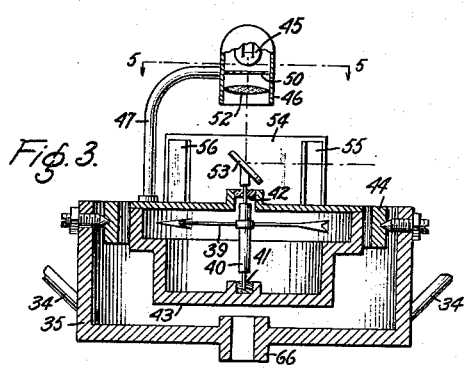
Fig.3.
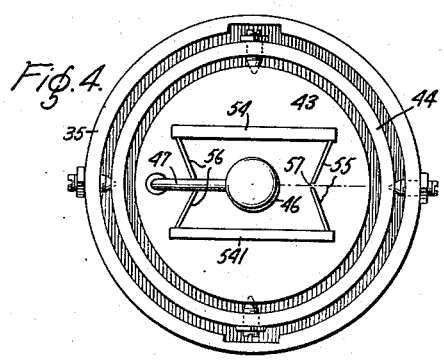
Fig.4.
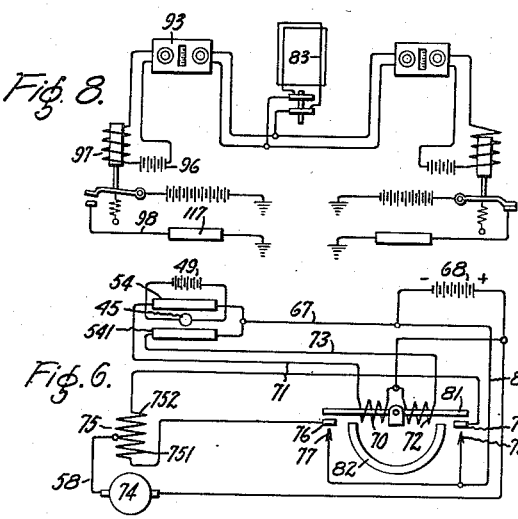
Fig.8.
Fig.6.
INVENTOR:
HJALMAR E. SJÖSTRAND.
by
HIS ATTORNEYS.

Patented May 18, 1937

2,080,511

UNITED STATES PATENT OFFICE 2,080,511

DEVICE FOR LOCATING THE POSITION OF A MOVABLE BODY

Hjalmar E. Sjöstrand, Ravala, Grangesberg, Sweden

Application December 10, 1932, Serial No. 646,728

12 Claims. (Cl. 250—11)

My invention more particularly relates to a device which utilizes electromagnetic waves of different characteristics and transmitted from spaced stations of known position for locating the position of a movable body. My invention is particularly applicable for use in locating the position of a vessel or airplane, although it will be understood that it is equally applicable for indicating the position of any movable body.

My invention will best be understood by reference to the accompanying drawings in which—

Fig. 1 is a perspective view illustrating somewhat diagrammatically the device embodying my invention;

Fig. 2 is a fragmentary sectional view illustrating the manner of supporting or suspending the parts of the device from a fixed support on the body;

Fig. 3 is a sectional view illustrating certain of the parts which maintain the table and the chart mounted thereon oriented in a predetermined direction;

Fig. 4 is a plan view of Fig. 3;

Fig. 5 is a section taken along the line 5—5 of Fig. 3;

Fig. 6 is a diagram of connections of the parts which maintain the table oriented;

Fig. 7 is a sectional view illustrating means for producing on the table or the chart mounted thereon lines coinciding with the lines of direction from the movable body to the respective stations from which electro magnetic waves of different characteristics are transmitted;

Fig. 8 is a diagram of connections illustrating the relation of the elements which receive electromagnetic waves of different wave lengths and produce intersecting lines which determine the position of the movable body; and Fig. 9 is a diagrammatic view illustrating a sensitive form of relay.

Like reference characters indicate like parts throughout the drawings.

Referring to the drawings and first to Figs. 1 to 5, 10 indicates generally a frame rotatably mounted or suspended on a support 11 which, in the case of a vessel for use on which I have particularly illustrated my device, is secured to the vessel.

The support 11 is provided with a hub or collar 12 having an opening 13 through which extends a shaft 14 having a flange 15 which is secured thereto and preferably formed integral therewith. Roller bearings 16 are preferably interposed between the flange 15 and the hub 12. The shaft 14 is continuously rotated by a sprocket 17, in the embodiment illustrated, secured to the shaft 14 and engaged by a sprocket chain 18 which may be continuously driven by any suitable source of power (not illustrated).

The shaft 14 is surrounded by a sleeve 19 located immediately beneath the hub 12 which is provided at its upper ends with a screw-threaded portion 20 on which is received a nut 21 which is in turn received in a recess 22 in a cross bar 23 forming part of the frame 10. The lower end of the sleeve 19 is provided with a flange 24, two supporting arms 25 and 26 being interposed between the flange 24 and the frame 23 and pivotally mounted on the sleeve. Bearing washers 27 are preferably interposed between the arm 25 and the frame 23. Sprocket wheels 28 and 29 are secured to and preferably integral with a hub 30 surrounding the shaft 14, the hub being secured to the shaft as by a pin 31. The sprocket wheels 28 and 29 actuate parts which will hereinafter be more fully described. Ball bearings 32 are preferably interposed between the upper end of the hub 30 and the flange 24 on the sleeve 19.

To the ends of the transverse bar 23 are secured supporting standards 34, the lower ends of which are secured to a dished member 35. A table 36 having an upper free surface is secured to the standards 34 as by nuts 37. In the embodiment of my invention illustrated, a chart 38 is mounted on the upper surface of the table 36, although it will be understood that under some conditions a chart will be unnecessary.

In accordance with my invention, means are provided for maintaining the table 36 oriented in a predetermined direction. In the embodiment of my invention illustrated the means for so maintaining the table oriented comprises a freely mounted magnetic needle 39 the spindle 40 of which has its bearings at 41 and 42 in the bottom and top plates, respectively, of a casing 43 which is mounted for universal movement within the dished member 35, the casing 43 being pivotally mounted in a gimbal ring 44 which is in turn rotatably mounted within the dished member 35, as in the usual gimbal. The magnetic needle is thus kept in a horizontal position irrespective of the movements of the vessel or other movable body on which it is located.

A source of light, which is shown in the form of an incandescent lamp 45, is mounted in a casing 46, the casing being mounted on a standard 47 which is in turn mounted on the casing 43.

The lamp 45 is included in a circuit (see Figs. 1 and 6) in which is included a battery 49. A transverse opaque partition 50 is mounted in the casing 46 and is provided with a narrow slit 51, as best shown in Fig. 5, through which passes a line of light which then passes through a projecting lens 52.

A mirror 53 is mounted on the upper end of the spindle 40 and preferably at an angle of 45° thereto. Selenium or other photo-electric cells, 54 and 541 are mounted on the casing 43 in spaced, and preferably in parallel relation, as best shown in Figs. 1 and 4. At the respective ends of the cells are mounted two pairs of mirrors 55 and 56 arranged at an angle to each other and to the photo-electric cells. The ends of the two pairs of mirrors 55 and 56 are slightly spaced as at 57. The lens 52 is so located relatively to the slit 51 in the partition 50 as normally to project the image of the slit between the mirrors 55.

I have illustrated a device for mounting the mirror and the parts associated therewith which are applicable for a vessel where the angle of turning of the vessel from the horizontal is through a comparatively small angle. It will, of course, be understood that if the device were used on an airplane, as it is intended to be, and where the plane may turn through an angle of 360°, that the gimbal ring 44 would have to be sufficiently large and the dished member 35 would have to be of sufficient depth to permit them to turn around the casing 46.

The means for maintaining the table oriented in a predetermined direction also comprises a motor 58 which, it will be understood, is mounted on a stationary portion of the vessel. The shaft 59 of the motor is provided with a worm 60 engaging a worm wheel 61 on a shaft 62, the lower end of which is provided with a bearing 63 received in an opening 64 in a part 65 of the vessel. It will be understood, however, that under some conditions the parts may be suspended from above and the bearing 63 will be unnecessary. In that case, however, the motor would be mounted on the fixed frame 11 and actuate a worm wheel secured to the frame 23. It will be understood that the shaft 62 is secured within the hub 66 in the lower portion of the dished member 35.

Referring particularly to Fig. 6, the selenium cells 54 and 541 are connected by a conductor 67 to one pole of a battery 68, the other pole of the battery 68 is connected to a point from which the circuit branches, one portion of the circuit passing through a coil 70 and conductor 71 to the selenium cell 54 while the other branch includes a coil 72 and a conductor 73 which is connected to the selenium cell 541.

The battery 68 is also connected to the armature 74 of the motor 58. The motor comprises a field indicated generally at 75 and comprising two windings 751 and 752. The terminal of the coil 751 is connected to a movable contact 76 which cooperates with a fixed contact 77 while the terminal of the field coil 752 is connected to a movable contact 78 cooperating with a fixed contact 79. Both of the fixed contacts 77 and 79 are connected by a conductor 80 to the battery 68. I have illustrated the coils 70 and 72 wound on a bar of iron 81 in a direction to produce opposite poles at the associated end of the bar when either of said coils is energized. A permanent magnet 82 is preferably associated with the bar 81 so that the associated end of the bar 81 is depressed when the coil 70 or 72 is energized, and the contact 76 or the contact 78 brought into engagement with the contact 77 or the contact 79, the two coils 70 and 72 being wound on the bar 81 in such directions as to reverse the poles at the ends of the bar 81 when the respective coils are energized.

The operation of the device for correcting the position of the table 36 and for maintaining the same oriented in a predetermined direction will readily be understood from the foregoing description and is as follows.

Normally, as above described, the line of light from the light source 45 passes through the space or opening 57 between the mirrors 55. Assuming that the vessel on which the device embodying my invention is mounted turns from its course, then the support 11 partakes of this movement and the frame 23 will be turned. The casing 43 will also be turned while the magnetic needle 39 and the mirror 53 which is mounted on the spindle thereof will remain stationary. The beam of light 45 then, instead of passing through the opening 57 between the mirrors, will be directed against one or the other of the mirrors 55 depending upon the direction of turning of the vessel and the light will be directed against the photo-electric cell 54 or 541. It will be understood that the surface of the table 35 or the chart 38 which is mounted thereon corresponds to a portion of the earth's surface.

Two points 123 and 124 are placed upon the chart corresponding in relative positions to the positions on the surface of the earth occupied by the two stations which transmit waves of different characteristics. The axis of the casing 105 is then positioned over the point 123. This position may conveniently be determined by moving the casing 105 until the slightly enlarged portion of the line of light produced by the enlarged portion 120 in the slot 118 coincides with the point 123. Similarly the axis of the casing 105ᵃ is placed exactly above the point 124. It will be understood that the supporting arms 25 and 104 for the casing 105 and the corresponding arms for the casing 105ᵃ may be so moved as to bring the casing to any desired position.

Assuming that the vessel turns and the light is directed against the cell 54, the resistance of the cell is greatly decreased and the coil 70, which is normally included in the circuit of the cell 54, and which is normally deenergized, is now energized and the associated end of the bar 81 is attracted by the magnet 82 and the left hand end of the bar, as viewed in Fig. 6, brings the movable contact 76 into engagement with the stationary contact 77 thereby closing a circuit from the battery 68 through the armature of the motor, the field coil 752, and the contacts 76 and 77 to the other pole of the battery 68. The armature of the motor is thereby caused to rotate in a direction to turn the dished member 35 in a direction to bring the mirrors 55 and 56 back to the position where the light beam from the mirror 53 passes through the opening 57. As the table 36 moves with the dished member 35, the position of the table is thereby corrected to maintain it oriented in substantially the same direction.

Conversely, should the vessel turn in the opposite direction, then the light from the lamp 45 would be directed against the photo-electric cell 541, the contacts 78 and 79 would be closed and the circuit closed through the armature of the motor 58 and through the field 752 and as the current is reversed in the field the armature of the motor would then rotate in the opposite direction, thereby returning the photo-electric cells and the table and chart to their normal positions.

While I have illustrated photo-electric cells and associated means for maintaining the table oriented in a predetermined direction, it will be understood that any known means may be utilized for this purpose.

In accordance with my invention, means are also provided for producing on the surface of the table or the chart mounted thereon visible lines which coincide with the lines of direction from the movable body to spaced radio stations of known location, in the embodiment illustrated two in number, from which electromagnetic waves of different characteristics are transmitted. In the embodiment of my invention illustrated, a wire loop 83 is wound on a suitable frame 84 which is mounted on the shaft 14, the loop being continuously rotated by the sprocket wheel 17. In accordance with my invention, radio or electromagnetic waves are continuously transmitted from spaced transmitting stations of known location to the device embodying my invention and are received by the loop 83. The terminals 85 and 86 of the loop are connected to collector rings 87 and 88, respectively. Brushes 89 and 90 engage the two collector rings and are connected to two conductors 91 and 92 respectively which are connected to receivers 93 and 94.

Preferably waves of different lengths are broadcast from the different stations and the receiver 93, as well as the receiver 94 is tuned to the wave length broadcast from a given station, and is received on the input side of the receiver and amplified. The amplified signal is partly rectified by the detector tube and the resultant current impulses pass through the circuit 95 which includes the battery 96 and the relay 97. The resultant current impulses vary in proportion to the incoming signal so that as the incoming signal increases the current in the relay circuit is correspondingly increased and vice versa. It is to be understood, however, that waves of the same length may be transmitted from the different stations with different modulated frequencies, and the different modulated frequencies separated in the audio side of the receiver. As current is normally induced in the loop 83 the relay 97 is normally energized and maintains normally open a circuit indicated generally at 98, said circuit being utilized for the production of visible lines which, in the embodiment illustrated, are lines of light on the chart 38.

A sprocket wheel 99 is provided with a hub 100 (Fig. 7) and is secured on a shaft 101 passing through the free end of the arm 25. The shaft 101 is surrounded by a sleeve 102, as best shown in Fig. 7, on the upper screw-threaded portion of which is received two washers 103 which are interposed between the end of the arm 25 and the sprocket wheel 99, suitable ball bearings preferably being provided between the hub 100 and the upper washer 103.

An arm 104 is pivotally mounted on the sleeve 102 and has a fairly tight fit thereon. On the end of the arm 104 is mounted a casing 105 on the contracted upper end 106 of which is mounted a sprocket wheel 107 which is engaged by a sprocket chain 108 which, in turn, engages a sprocket wheel 109, secured on the shaft 101, so that the sprocket wheel 107 and the casing on which it is mounted is continuously rotated. The casing 105 is closed at its upper end and open at its lower end and in the upper portion of the casing is mounted a source of light 110 which is preferably a neon light and of the type which quickly becomes light when current passes therethrough and becomes dark when the current ceases. The current is conducted to the light by a conductor 111 mounted on a stationary member 112, the conductor 111 being connected to a conducting strip 113 preferably provided with a contact member 114 which engages a conductor 115 which is connected to one terminal of the lamp 110, the other end of the lamp 110 being grounded as at 116. Light rays from the neon lamp pass through a cylindrical lens 117 which concentrates the light rays into a slot 118 with which a partition member 119 mounted in the casing 105 is provided. The slot 118 may be similar to the slot 51 except for the fact that an enlarged portion 120 is preferably provided at an intermediate portion of the slot for a purpose which will hereinafter be referred to.

The beam of light passing through the slot 118 then passes through wide angle projection lenses 121 which project and intermittently produce on the chart a visible line of light 122.

It will, of course, be understood that suitable take-up mechanism for the sprockets which are actuated by the shaft 14 and which have not been illustrated, are provided. Furthermore, suitable gearing may be interposed between the shaft 14 and the casing 105 for driving the same from the shaft.

As heretofore stated, the construction and operation of the casing 105ᵃ and the parts associated therewith are the same as described in connection with the casing 105 and the associated parts.

While I have illustrated one construction that is suitable for rotating the casings 105 and 105ᵃ, and for directing intersecting lines of light upon the chart, it will be understood that other means may be used for producing the intersecting lines. For example, the respective casings 105 and 105ᵃ may be properly positioned with respect to the transmitting stations by coils of the character illustrated in my application Ser. No. 646,729 which was filed in the Patent Office on or about December 10, 1932, Patent No. 2,043,336, issued June 9, 1936. Furthermore, the casings 105 and 105ᵃ may be properly positioned by the operator by known direction finders.

The coil 83 may conveniently be rotated at a speed of say 250 R. P. M., thereby closing the circuit 98 approximately 500 times per minute. Members 105 and 105ᵃ are so geared to the shaft 14 as to be rotated in synchronism with the coil 83, but are, in the embodiment here shown 90° out of phase therewith.

The operation of the device for producing lines of light on the chart 38 will readily be understood from the foregoing description, and is as follows: when the plane of the coil 83 is at right angles to the direction line between the movable body on which the device is located and the transmitting station from which the waves under consideration are being received, the plane of the coil 83 is parallel to the direction line of the electromagnetic waves, and momentarily there is no induced current in the coil 83. The circuit 98 including the lamp 110 is thereby closed and a light line 122 is produced on the chart which coincides with the direction line from the movable body to the transmitting station from which the waves are being received.

Similarly, a line 125 is produced on the chart by the lamp and associated parts within the casing 105ᵃ which coincides with the line of direction from the movable body to the other station whose transmitting waves are of a different characteristic from the first station assumed.

Now, when the points 123 and 124 correspond in their positions on the chart to the positions occupied by the two transmitting stations on the earth's surface, the lines 122 and 125 which pass through the points 123 and 124 respectively coincide with the line of direction from the movable body to the respective stations, and the point of intersection between the two lines 122 and 125 will correspond to the location of said movable body on the surface of the earth.

It will, of course, be understood that the relay 97 may be quick acting and sensitive and acts reversely to the ordinary relay. That is, when the ordinary relay is energized, the circuit controlled thereby is closed. On the other hand, when the relay 97 is energized the circuit 98 controlled thereby is opened.

In Fig. 9 I have illustrated a sensitive relay which is better adapted to respond to the rather feeble currents from the receiver than that illustrated in Fig. 1. In the embodiment here illustrated the output side of the receiver 94 is connected to the primary 941 of a transformer, the secondary 942 of which is connected to a galvanometer 127 through a permanently adjusted crystal 943 or other suitable type of valve. This arrangement gives the galvanometer a pulsating direct current and holds the mirror to one side only and is also free from current when no signal is received.

An electric lamp 129 is included in a circuit including a battery 130. The light from the lamp passes through a slit 131 in a screen 132 through a projector lens 133 and against the mirror 128. Normally the beam of light from the mirror 128 is reflected against a screen 134. When, however, minimum current is received in the coil of the galvanometer 127, then the mirror 128 is turned in such a direction as to reflect the beam past the screen 134 and against the selenium cell 54, thereby closing a circuit to a relay corresponding to the relay 97, or directly to the lamp 110.

While I have described my invention in its preferred embodiment, it is to be understood that the words which I have used are words of description rather than of limitation and that changes within the purview of the appended claims may be made without departing from the true scope and spirit of my invention in its broader aspects.

What I claim is:

1. In a navigating apparatus for a movable body, a chart movably mounted on said body, means for maintaining said chart oriented, pivotally mounted indicating means, universally mounted supporting means for said indicating means affording universal adjustment thereof relative to said chart whereby said indicating means may be positioned to pivot over points on said chart representing the geographical position of transmitting stations, a rotatable loop antenna, means for rotating said antenna and said indicating means substantially in synchronism, and means associated with said loop and indicating means for effecting an antenna-controlled operation of said indicating means.

2. In a device of the character described for use on a movable body, a chart movably mounted on said body, means for automatically maintaining said chart oriented, means for receiving radio magnetic waves transmitted from known broadcasting stations, a plurality of means controlled by said receiving means adapted cooperatively to indicate continuously on said chart the position of said movable body and universally mounted supporting means movable relatively to said chart for said last mentioned means whereby said means may be moved over said chart and provide an uninterrupted indication of the geographical location of said body.

3. In a device of the character described for use on a movable body, a chart movably mounted on said body, means for automatically maintaining said chart oriented, means for receiving radio magnetic waves transmitted from known broadcasting stations, indicating means controlled by said receiving means and comprising a plurality of pivotally mounted linear indicators adapted cooperatively to indicate on said chart the position of said movable body, and universally mounted supporting means movable relatively to said chart for said indicating means whereby said indicators may be positioned to pivot over points on said chart representing the geographical locations of said stations.

4. In a navigating apparatus for a movable body, a chart movably mounted on said body, means for automatically maintaining said chart oriented, means including a directional antenna for receiving radio magnetic waves transmitted from a desired plurality of broadcasting stations, means operable in response to the desired, induced currents in said antenna of predetermined magnitude to produce on said chart intersecting linear indications representing the directions of said stations from said body, and universally mounted supporting means movable relatively to said chart for said last mentioned means whereby said means may be positioned over points on said chart representing the desired broadcasting stations.

5. In a navigating apparatus for a movable body, a chart movably mounted on said body, means for automatically maintaining said chart oriented, a rotatable loop antenna, indicating means, means for rotating said antenna and indicating means substantially in synchronism, and means responsive to induced antenna currents interposed in circuit with said antenna for controlling an operation of said indicating means to produce an indication on said chart representing the geographical position of said movable body.

6. In a device of the character described for use on a movable body, a chart movably mounted on said body, means for maintaining said chart oriented, means for receiving radio magnetic waves transmitted from a broadcasting station including a rotatable loop antenna, means for rotating said loop, a plurality of means controlled by said receiving means for producing an indication on said chart representing the geographical position of said movable body, and universally mounted means movable relatively to said chart for supporting said indicating means whereby said means may be positioned over desired points on said chart.

7. In a device of the character described for use on a movable body, a chart movably mounted on said body, means for maintaining said chart oriented, means for receiving radio magnetic waves transmitted from a plurality of broadcasting stations including a rotatable loop antenna, means for rotating said loop, a plurality of means controlled by said receiving means for producing linear indications on said chart representing the directions of said stations from said body, and universally mounted means comprising arms movable over said chart for supporting said indicating means whereby said means may be positioned over any desired point on said chart.

8. In a navigating apparatus for a movable body, a chart movably mounted on said body, means for automatically maintaining said chart oriented, means for receiving radio magnetic waves transmitted from broadcasting stations including a rotatable loop antenna, means for rotating said antenna, a plurality of means controlled by said receiving means adapted cooperatively to indicate on said chart the geographical position of said body, and universally mounted means comprising arms movable relatively to said chart and to each other for supporting the respective indicating means, whereby said latter means may be positioned over desired points on said chart representing geographical locations of broadcasting stations.

9. In a navigating device of the character described for use on a movable body, a chart movably mounted on said body, means for automatically maintaining said chart oriented, means for receiving radio magnetic waves transmitted from known broadcasting stations, a plurality of cooperatively disposed means controlled by said receiving means adapted cooperatively to indicate on said chart the geographical position of said body, and universal supporting means for said last mentioned means; said supporting means being adapted to permit universal adjustment of said last mentioned means to desired positions over said chart.

10. In a navigating device of the character described for use on a movable body, a chart movably mounted on said body, means for automatically maintaining said chart oriented, means for receiving radio magnetic waves transmitted from known broadcasting stations including a rotatable loop antenna, a plurality of cooperatively disposed indicating means controlled by said receiving means adapted cooperatively to indicate on said chart the position of said body, universal supporting means therefor and means for rotating said indicating means and loop; said supporting means and last mentioned means affording universal adjustment of said indicating means over said chart while maintaining said indicating means in fixed angular relation to said loop.

11. In a navigating device of the character described for use on a movable body, a chart movably mounted on said body, means for automatically maintaining said chart oriented, means for receiving radio magnetic waves transmitted from known broadcasting stations including a rotatable loop antenna, a plurality of cooperatively disposed indicating means controlled by said receiving means adapted cooperatively to indicate on said chart the position of said body, universal supporting means therefor and means for rotating said indicating means and loop; said supporting means and last mentioned means affording universal adjustment of said indicating means on said chart while maintaining said indicating means substantially at right angles to the plane of said loop.

12. In a navigating device of the character described for use on a movable body, a chart movably mounted on said body, means for automatically maintaining said chart oriented, a first electrical circuit including means for receiving radio magnetic waves transmitted from desired broadcasting stations, a second electric circuit including a plurality of cooperatively disposed means adapted cooperatively to indicate on said chart the position of said body, means for supporting said last mentioned means for permitting universal adjustment thereof relative to said chart and means disposed in said first circuit and operable when the desired induced currents in said receiving means are a minimum for controlling the operation of said indicating means.

HJALMAR E. SJÖSTRAND.